Aug. 11, 1936.        S. RUBEN        2,050,587
ELECTROLYTIC CONDENSER
Filed Feb. 17, 1934
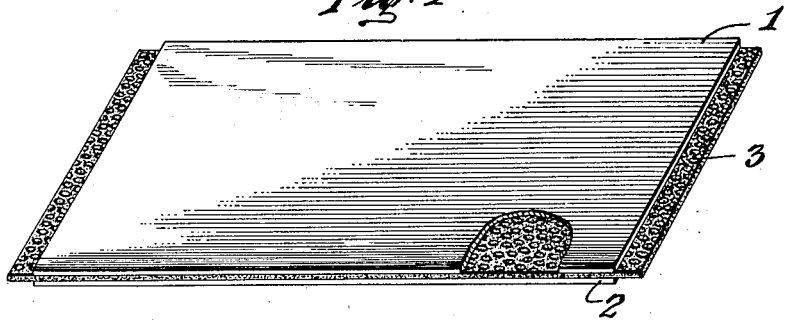
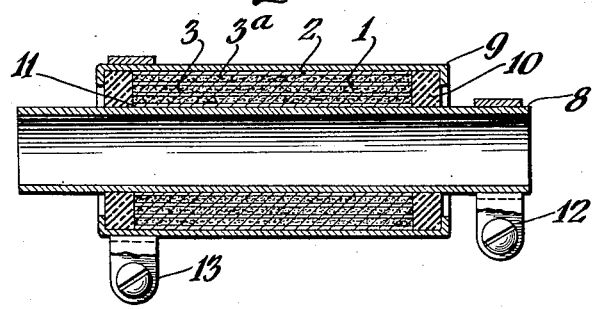
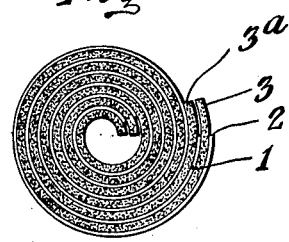
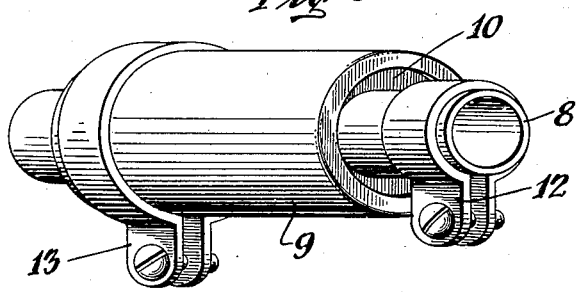
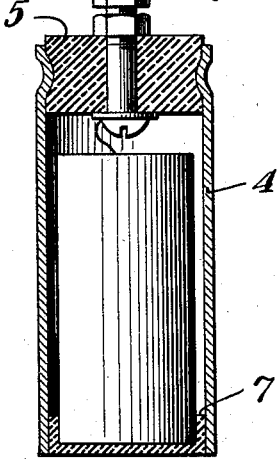
INVENTOR
Samuel Ruben
BY
ATTORNEY Patented Aug. 11, 1936

2,050,587

UNITED STATES PATENT OFFICE 2,050,587

ELECTROLYTIC CONDENSER

Samuel Ruben, New Rochelle, N. Y., assignor to Ruben Condenser Company, Dover, Del., a corporation of Delaware Application February 17, 1934, Serial No. 711,629

8 Claims. (Cl. 175—215)

This invention relates to electrolytic condensers. Specifically, it relates to electrolytic condensers of the "dry" type and film forming electrodes suitable for use therein.

An object of the invention is to provide an electrolytic condenser having an electrode which forms a dielectric film more readily than condenser electrodes of the prior art and which generally has improved film forming properties.

A further object is to provide an electrolytic condenser electrode having a greater capacity per unit area than electrodes of the prior art.

Another object of the invention is to provide an aluminum-tantalum electrode specifically for electrolytic condensers.

A further object is to provide an electrolytic capacitor capable of withstanding higher voltages and currents than capacitors of this type now in use.

Another object is to provide an electrolytic capacitor having a very low power factor.

Other objects will be apparent from the disclosure and from the drawing in which Fig. 1 is a perspective view, partly broken away, of one embodiment of the invention showing a flat plate condenser;

Fig. 2 is an end view of a modification showing an arrangement of the invention in coiled form;

Fig. 3 is a vertical sectional view of an arrangement somewhat similar to Fig. 2, enclosed within a protective casing;

Fig. 4 is a cross section of another type of construction, and

Fig. 5 is a perspective view of the device illustrated in Fig. 4.

This application may be said to be a continuation in part of my co-pending application S. N. 686,887, filed 26th August 1933.

Heretofore, aluminum has been generally used as the anode material for electrolytic condensers. This is due to its desirable mechanical properties, its low cost, and effective film forming characteristics.

While generally of service, the film of oxide formed on aluminum has been to a certain extent porous, and it has a tendency to thicken with use. The effectiveness of an electrolytic capacitor or condenser is determined by its capacitance per unit area, leakage and power factor. The power factor of a condenser is related to such characteristics as internal resistance of electrolyte, condenser leakage and resistance of the dielectric film. On alternating current, another factor is introduced, which may be termed the electrochemical film forming hysteresis which increases with the frequency. The oxide film loss increases with thickness of the oxide layer for a given voltage and also with temperature.

Initially, the thickness of the oxide is determined in a given electrolyte, by the applied film forming potential. I believe that the subsequent increase in film thickness is due to leakage through the film, due in turn to porosity. This effect is aggravated at higher temperatures.

In the present invention, I utilize an electrode formed from an alloy of aluminum and tantalum. I have found that the film formed from such an electrode has a greater capacitance per unit area, is much denser, has a lower leakage and for a given electrolyte, a lower power factor with reduced film forming hysteresis loss, than a film formed from substantially pure aluminum. I also find that it is capable of withstanding a higher temperature and of maintaining its initial capacitance and power factor over a longer period. These qualities are of particular advantage in relation to "dry" electrolytic condensers which are now being extensively used with "condenser-starting" motors.

The aluminum-tantalum electrode forms up more quickly and deforms less readily, than the aluminum electrodes. The presence of the tantalum serves to minimize the possibility of corrosion and reduces the sensitivity to halogen salts.

Where condensers employing a formed tantalum-aluminum anode are used on direct current such as in radio receivers, I find that they will withstand a much higher voltage than condensers of the prior art. For instance, in comparison with a condenser having an aluminum anode formed under the same conditions, a condenser having an anode composed of 99.9% aluminum and .1% tantalum withstood a 20% higher voltage for a given leakage value.

The decrease in power factor of condensers which obtains from the use of the aluminum-tantalum electrode may be illustrated in the following typical results. The electrodes compared were of identical dimensions and were identically treated and formed.

| Electrode material | Power factor |
|---|---|
| | Percent |
| Pure Al foil | 5.7 |
| 99.945% Al, 0.055% Ta foil | 4.5 |
| 99.89% Al, 0.11% Ta foil | 3.5 |

The capacitance of the film-formed aluminum-tantalum electrodes was also in excess of that of the pure aluminum electrode.

The increase in voltage breakdown and capacitance per unit area indicates the formation of a more effective, yet thinner film, on the aluminum-tantalum electrode.

The percentage of tantalum to be alloyed with the aluminum depends upon the use to which the condenser is to be applied and the desired thickness of the foil. Where the foil is to be quite thin, a percentage of .05 to 1% tantalum is desirable. If more tantalum is added, rolling becomes difficult, although for some purposes it may be of advantage to increase the percentage of tantalum to 2%. For present day requirements, I do not believe it necessary to increase the tantalum content substantially above the latter percentage.

In accordance with the present invention, an electrode is formed from a sheet of an aluminum-tantalum alloy and provided with a current-blocking film by the well known electrolytic method. I prefer to use a solution of chemically pure sodium borate and boric acid in distilled water for the forming bath. The cooperating electrode should preferably be made from the same metal and if the condenser is to be used for alternating current work, it should be similarly film-formed. It has been found that the forming time for an aluminum-tantalum alloy electrode is less than one half of that required to form an electrode of pure aluminum, in the same solution.

I prefer to use the electrode of this invention in condensers of the "dry" electrolytic type as described in my Patents 1,710,073; 1,714,191; 1,891,207; 1,918,716, etc.

It will be seen from a reading of these patents that the condensers can be constructed with a fibrous porous spacer such as gauze or with a non-fibrous spacer such as sheet cellulose. I prefer to use the type of spacer and electrolyte described in my Patent 1,918,716. Preferably, I use a regenerated non-fibrous cellulose sheet such as embossed "cellophane" which has been conductively plasticized by immersion in an adhesive film maintaining electrolyte, which may be made as follows:

350 grams of boric acid, 200 cc. of 28% ammonium hydroxide and 640 cc. of ethylene glycol are stirred and heated to 128° C. and kept at approximately that temperature for about ten minutes. To three parts of this paste I add by weight, one part of a mixture made as follows: Two parts of pure gelatine powder are dissolved in two parts water to which is added three parts of ethylene glycol. The mixture is stirred and heated to 106° C. to allow free water to be evaporated. The combined mixture consisting of 75% of the glycol-boric acid-ammonia and 25% gelatinized glycol is then heated to 128° C. The resulting product is an adhesive mixture which sticks tenaciously to the electrodes and the spacer and which becomes absorbed into and permeates the spacer. When heated, it does not tend to leave the plates or collect into circular areas. This quality is of fundamental importance in connection with condensers which employ the combination of non-fibrous non-porous sheet spacers and flat foil electrodes.

The above electrolyte is quite satisfactory when the condenser is operated at low voltages or for alternating current applications as for 110 volts, the gelatine affording a good adhesive action. Where the potential is in the order of 600 volts, a higher resistance electrolyte is necessary and for such conditions, I prefer to substitute pure dextrin in the order of 7% for the gelatine, or to dispense with the adhesive altogether.

In some cases, it may be desirable to use as a spacer material, "cellophane" which has not been thoroughly dried and which contains ammonium borate or boric acid in suspension.

One form of condenser can be constructed as follows: Two electrode sheets are coated with the gelatinized glycol-boric acid-ammonia mixture, the conditioned embossed "cellophane" being placed in between the electrodes and the whole compressed to insure good physical contact. The adhesive glycol-boric acid-ammonia becomes absorbed into and suspended in the "cellophane" which is thereby rendered completely conductive throughout its entire surface. If the condenser is to be rolled, another "cellophane" spacer is used and the rolling carried out in the usual manner. Such a condenser has a very uniform distribution of current over the entire contacting area and localization is prevented.

In order to afford a detailed description of some forms of the invention, reference is made to the accompanying drawing (in which like numbers indicate like parts).

In the flat type condenser of Fig. 1, the anode (1) composed of an aluminum-tantalum alloy having a pre-formed oxide film or layer, is spaced from aluminum-tantalum cathode (2) by embossed "cellophane" sheet (3) which has been rendered electrolytically conductive and adhesive by the absorption of a gelatinized glycol-boric acid-ammonia compound.

In the rolled condenser of Fig. 2, an additional conductive "cellophane" spacer (3a) has been provided.

In the housed condenser of Fig. 3, the can (4) acts as one terminal being insulated from the other terminal (6) by insulator member (5). Insulation at the bottom of the can is provided by insulator (7). In order to avoid differences in potential, the can may be constructed from the same metal composition used for the electrodes.

In Figures 4 and 5 is shown a structure capable of long continuous operation and having an air cooling channel. The condenser is constructed by having the electrode plates and conductive spacers concentrically wound (in the manner described above) around an open aluminum-tantalum alloy tube (8) with which one of the electrodes makes direct contact. After the condenser has been wound, contact with the other electrode is made by outer aluminum-tantalum alloy tube (9) which serves as a protective wrapper and has its ends spun over after the condenser has been assembled. Insulator bobbins (10) and (11) serve as sealing means. Connections to an external circuit are made with terminals 12 and 13. The unit is preferably mounted vertically to allow a circulation of air through the center electrode tube.

It will be seen that this construction not only obviates the necessity of providing a can but also provides a desirable construction for cool operation and mounting.

While this application is drawn specifically to the use of an aluminum-tantalum alloy for the film forming electrode material, it is possible to form the alloy of aluminum and columbium, which, by nature, is commonly associated with tantalum as an impurity. As the latter is comparatively rare and more expensive, I prefer to use tantalum as the alloying element.

The aluminum used in the alloy should be of the purest commercial grade obtainable, it being understood that the presence of minute impurities is practically unavoidable.

Since certain changes in carrying out the construction of the condensers and its components and obvious substitutions can be made in the materials used without departing from the scope of the invention, it is intended that all matters contained in the above description, or shown in the accompanying drawing shall be interpreted as illustrative and not in a limiting sense.

Having described my invention, what I claim as new and desire to secure by Letters Patent, is:

1. An electrode for electrolytic condensers comprising an alloy of aluminum and one of the elements tantalum and columbium, the percentage of aluminum being substantially not less than 98%.

2. An electrode for electrolytic condensers comprising an alloy consisting preponderantly of aluminum and containing substantially not more than two (2%) per cent of one of the elements, tantalum and columbium.

3. An electrode for electrolytic condensers comprising an alloy consisting preponderantly of aluminum and containing substantially not more than two (2%) per cent of tantalum.

4. An electrode for electrolytic condensers comprising an alloy consisting preponderantly of aluminum and containing substantially not more than one (1%) per cent of tantalum.

5. An electrode for electrolytic condensers comprising essentially aluminum and tantalum, the percentage of aluminum being not less than ninety-nine (99%) per cent.

6. An electrode for electrolytic condensers comprising an alloy containing as an essential ingredient thereof an element selected from group consisting of tantalum and columbium in a proportion of substantially not more than two per cent and the remainder substantially all aluminum.

7. An electrolytic condenser comprising a container, a film-forming electrode and an electrolyte therein, said electrode being formed of an alloy consisting preponderantly of aluminum and containing as an essential ingredient thereof an element selected from the group consisting of tantalum and columbium in a proportion of substantially not more than two per cent.

8. A dry electrolytic condenser comprising a container and a condenser section therein, said section comprising a pair of closely spaced electrode foils at least one of which is film-formed, a film-maintaining electrolyte therebetween and terminals connected to said electrode foils, at least one of said electrode foils being formed of an alloy consisting preponderantly of aluminum and containing as an essential ingredient thereof an element selected from the group consisting of tantalum and columbium in a proportion substantially not more than two per cent.

SAMUEL RUBEN.